United States Patent [19]

Barnes

[11] 4,026,060

[45] May 31, 1977

[54] LOCK FASTENER FOR A FISHING REEL

[75] Inventor: Richard D. Barnes, Costa Mesa, Calif.

[73] Assignee: Garcia Corporation, Teaneck, N.J.

[22] Filed: Jan. 30, 1976

[21] Appl. No.: 654,053

[52] U.S. Cl. .............................. 43/22; 151/41.74; 151/69
[51] Int. Cl.² ....................................... A01K 87/06
[58] Field of Search ............. 43/22; 151/69, 41.73, 151/41.74

[56] References Cited

UNITED STATES PATENTS

| 2,409,516 | 10/1946 | Rosenthal et al. | 151/69 |
| 2,709,470 | 5/1955 | Knohl | 151/69 X |
| 3,426,466 | 2/1969 | Shepherd | 43/22 |

*Primary Examiner*—Russell R. Kinsey
*Assistant Examiner*—Daniel J. Leach
*Attorney, Agent, or Firm*—Fitzpatrick, Cella, Harper & Scinto

[57] ABSTRACT

A lock fastener for a fishing reel which includes a first member formed with a threaded bore therein and adapted to engage the foot of a fishing reel and hold it in locked position on an associated fishing rod, a second member having a shank dimensioned to screw into the bore of the first member, the shank being recessed along a portion of its length and a lock member positioned between the first member and the recessed portion of the second member wherein the lock member prevents complete withdrawal of the second member from the first member but permits a limited amount of withdrawal so that the fishing reel may be readily removed from or locked onto the fishing rod.

7 Claims, 6 Drawing Figures

LOCK FASTENER FOR A FISHING REEL

BACKGROUND OF THE INVENTION

1. Field of the Invention

This invention relates to lock fasteners and more particularly it concerns a novel lock fastener useful for retaining a fishing reel on a fishing rod.

2. Description of the Prior Art

Lock fasteners have previously been designed to provide a positive locking action between the elements of the fastener. However, once the elements are locked in interrelation, limited movement therebetween is not possible. Accordingly, where a limited amount of loosening of the fastener elements is required, a lock fastener can not be used.

Securing a fishing reel to a rod is one example of where a conventional lock fastener is not practical. Fishing rods are often provided with a reel retainer which includes a screw passing through the rod and a retainer element provided with a threaded bore to accommodate the screw. The retainer element is shaped to engage the foot of the reel when the fastener is tightened. It will be apparent that the reel retainer cannot be a conventional lock fastener since it would not permit the loosening of the retainer for disengaging the reel from the rod.

The conventional screw fastener arrangement used to retain a fishing reel is disadvantageous since the screw can be accidentally withdrawn and lost either during use of the fishing rod or during transport.

SUMMARY OF THE INVENTION

The present invention avoids the disadvantages of the prior art by means of a novel lock fastener which permits the elements thereof to be loosened while at the same time preventing the complete disassembly of the lock fastener. According to the present invention there is provided a novel lock fastener which includes a first member having a threaded bore formed therein, a second, elongated member having a threaded tip and a recessed portion adjacent thereto, the screw being dimensioned to fit within the bore and means positioned between the first member and the recessed portion of the second member to permit only partial withdrawal of the second member from the first member once the fastener has been tightened.

The lock fastener of the instant invention is adapted for use in fastening a fishing reel to a rod since such a fastener permits loosening of the reel retainer while preventing complete separation and possible loss of the elements which make up the fastener. Although specifically described herein in relation to a fishing rod, it will be readily appreciated that the lock fastener of the invention may find application in any number of fields wherein it is desired to utilize a lock fastener having a predetermined limited loosening capability.

There has thus been outlined the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that this invention may be utilized as a basis for designing other structures for carrying out the several purposes of this invention. It is therefore important that the claims be regarded as including such equivalent constructions as do not depart from the spirit and scope of the invention.

BRIEF DESCRIPTION OF THE DRAWINGS

One embodiment of the invention has been chosen for purposes of illustration and description, and is shown in the accompanying drawings forming a part of the specification wherein:

FIG. 6 is a section view taken along line 6—6 of FIG. 4.

DETAILED DESCRIPTION OF THE PREFERRED EMBODIMENT

Figure 1:
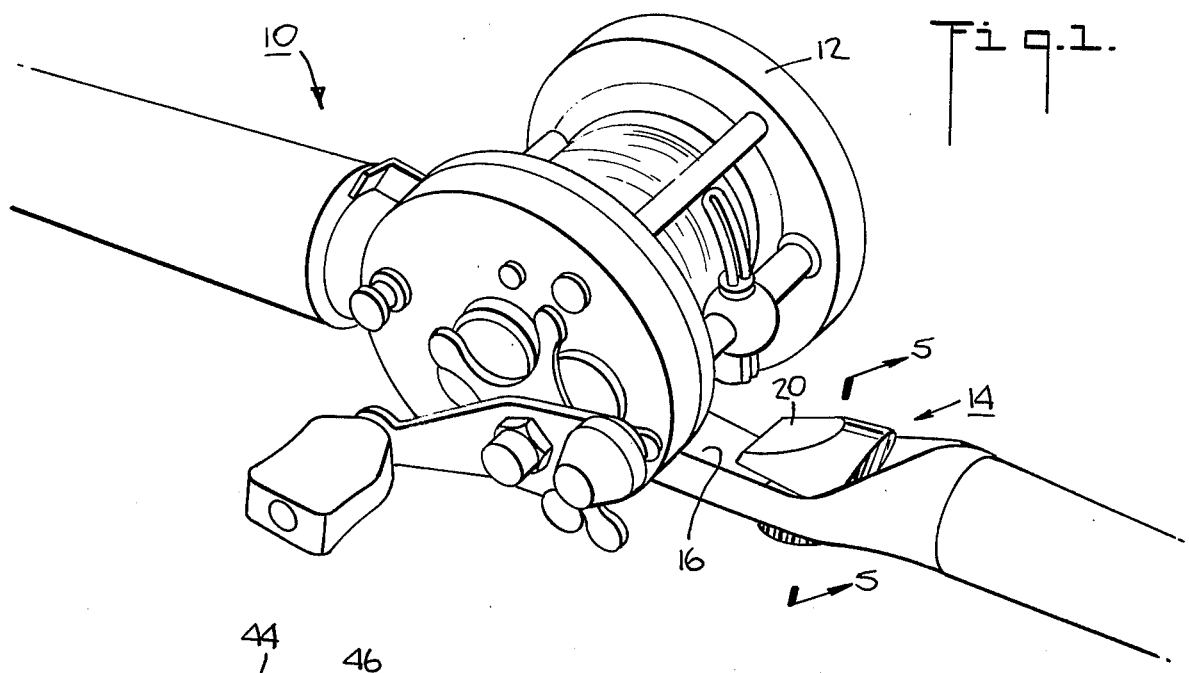
FIG. 1 is a perspective view of a lock fastener embodying the present invention used as a reel retainer for a fishing rod.
Figure 2:
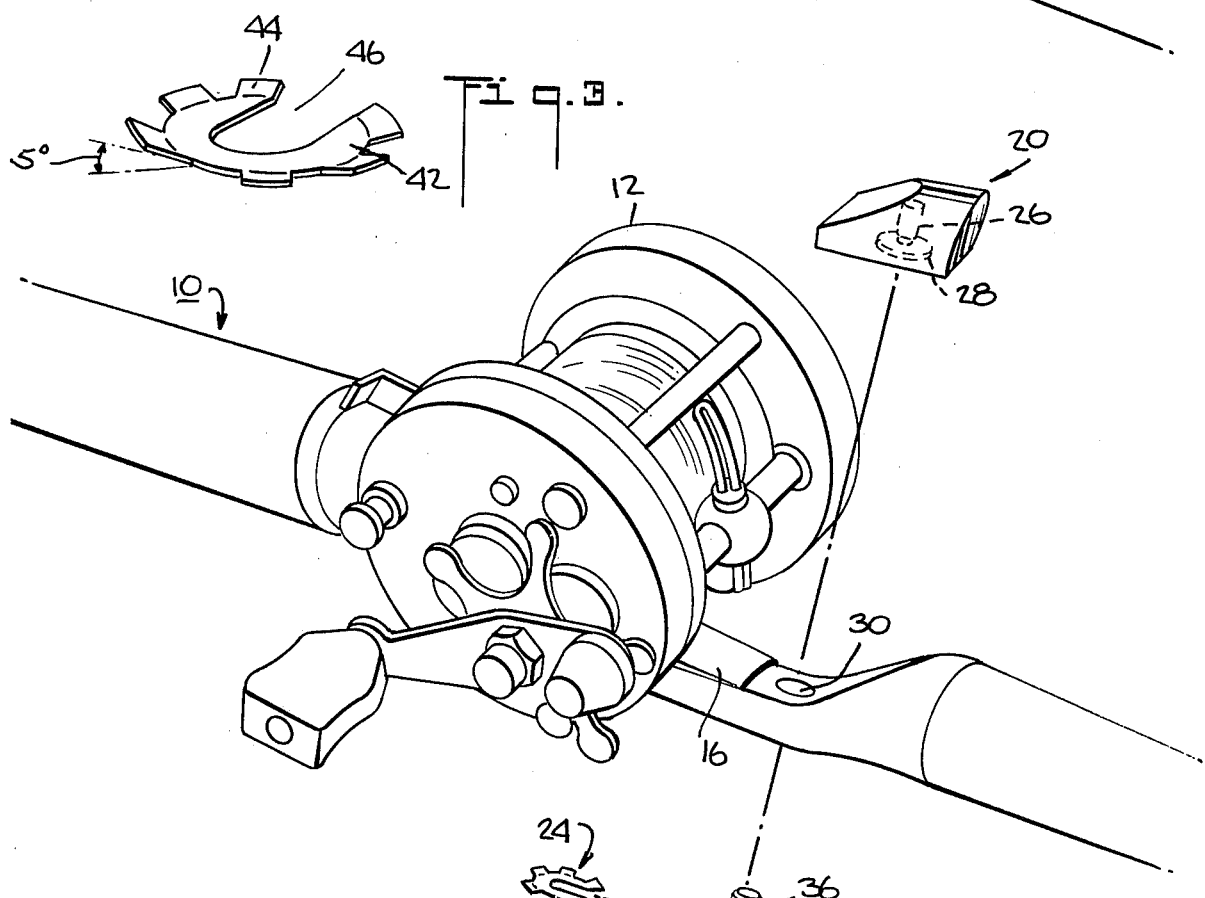
FIG. 2 is an exploded perspective view of the lock fastener of FIG. 1.

As shown in FIGS. 1 and 2, there is provided a fishing rod 10 and a reel 12 fastened thereto by a lock fastener 14 which engages one end of a foot 16 of the reel 12. The other end of foot 16 (not shown) is positioned within a non-adjustable slot or housing (not shown) adjacent the handle portion of the rod 10. In such manner the foot 16 of the reel 12 is secured to the rod for use therewith.

The lock fastener 14 includes a reel retainer element 20, a screw 22 and lock member 24. The retainer element 20 is formed with a threaded bore 26 and a counterbore 28. The screw 22, which passes through a bore 30 formed through the rod 10, includes a knurled head 32 and an elongated shank 34. The shank has a threaded tip portion 36, a main body portion 38 and a recessed portion 40 formed therebetween.

Figure 3:
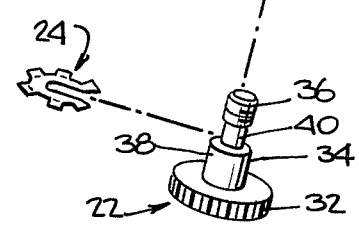
FIG. 3 is a perspective view of a lock member which forms a part of the lock fastener of FIG. 1.

The lock member 24, as best seen in FIG. 3, includes a C-shaped main portion 42 and a plurality of teeth 44 formed about the outer edge of the main portion 42. The teeth are preferably formed at an angle of about 5° to the plane of the main portion 42 for a purpose to be explained hereinafter. Finally, an opening 46, which gives the main portion 42 its C-shape, is provided so that the spring member may be easily positioned about the recessed portion 40 of the screw 22. It is preferred to provide teeth 44 at each end of the main portion 42 to define a slight angular opening which facilitates positioning thereof on the screw member 22.

The lock member 24, is preferably made from spring steel to provide sufficient resiliency to enable the lock member to be bowed and wedged into counterbore 28 as will be further explained hereinafter.

Figure 4:
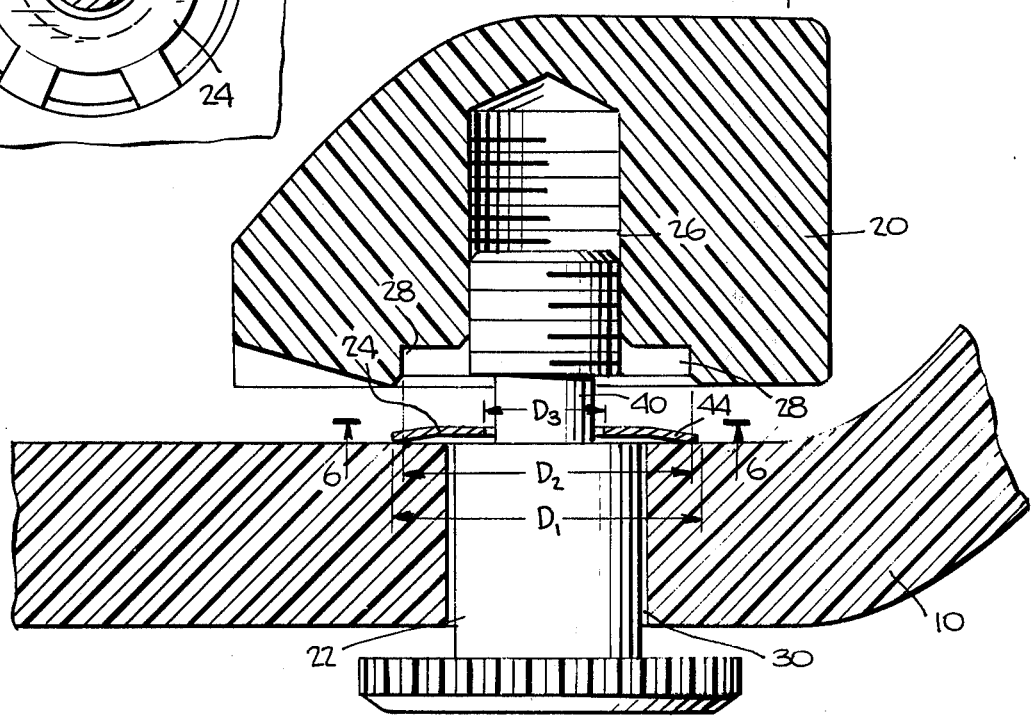
FIG. 4 is a side elevation view, partially cut away, of the lock fastener of FIG. 1, showing the elements thereof before being locked together.

Turning to FIG. 4, there is shown the lock fastener 14 positioned on rod 10 prior to locking the fastener together. The screw 22 is passed through bore 30 and is partially screwed into the threaded bore 26 of retainer element 20 while the lock member is positioned about the recessed portion 40. As clearly shown in FIG. 4, spring member 24 has an outer diameter $D_1$, defined by teeth 44, slightly greater than the diameter $D_2$ of counterbore 28 and an innermost diameter $D_3$ slightly greater than that of the recessed portion 40 but less than the diameter of either the tip or main body portions of screw 22.

Figure 5:
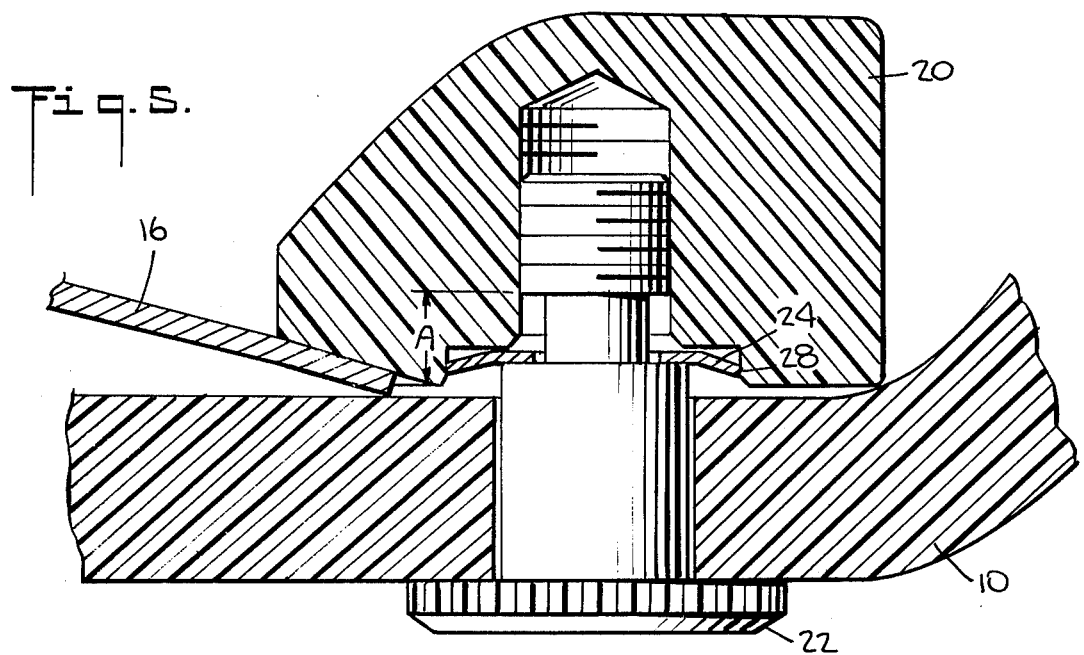
FIG. 5 is a fragmentary section view along line 5—5 of FIG. 1.
Figure 3:
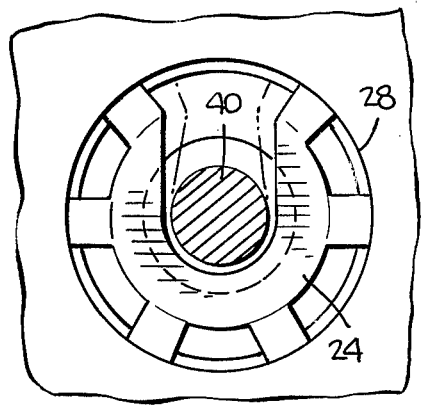

As the screw 22 is threaded into bore 26, the lock member 24 enters the counterbore 28. Continued threading causes the main body portion 38 to bow or bend the lock member 24 as it moves into the counterbore 28 until it assumes the position shown in FIG. 5. This bowing is facilitated by the angled teeth 44 formed at the outer edge of main portion 42 which engage the inner wall of the counterbore 28 when in locked position. The tendency of the lock member 24 to return to its initial condition, shown in FIG. 6, causes the teeth 44 to lock against the inner wall of the counterbore 28.

While both the inner and outer diameters of the lock member 24 are reduced somewhat when the lock member is wedged against the inner wall of counterbore 28, the inner diameter reduction is very slight and does not cause the lock member 24 to wedge against the adjacent recessed portion 40. Instead, the screw 22 may be freely withdrawn a distance 'A' equal to the length of the recessed portion 40. However, once the threaded tip portion 36 engages the lock member 24, further withdrawal by unscrewing tends to firmly wedge the bowed lock member against the inner wall of the counterbore 28 and prevents additional withdrawal of the screw 22 from the threaded bore 26. Therefore, once the lock member is set into place, the elements are firmly locked against withdrawal more than the length of recessed portion 40.

The distance 'A', i.e. the length of the recessed portion 40, is selected to permit the desired amount of relative movement between the elements of the lock fastener. Thus, when used as a reel retainer, the distance 'A' is selected so that the screw may be withdrawn an amount which will permit the foot of a reel to be readily withdrawn from or alternatively, positioned under, the retainer element 20.

What is claimed is:

1. In combination, a fishing rod and a lock fastener for securing a fishing reel to said rod, said lock fastener comprising a reel retainer element constructed and arranged to engage the foot of a reel when said reel is positioned on said rod, said element having a threaded bore formed therein; an elongated screw having a head and a shank, said shank including a threaded tip and a recessed area adjacent said threaded tip, said screw being dimensioned to extend through a bore formed in the rod and into threaded engagement with said retainer element, and means positioned between said retainer element and said rod in association with the recessed area of said shank to permit only partial withdrawal of said screw from said retainer element once said fastener has been tightened, whereby said lock fastener may be partially loosened to position a reel foot between said retainer element and said rod or to remove a reel foot therefrom.

2. The combination according to claim 1, wherein said retainer element is counterbored and said means includes a resilient lock member having an inner and an outer edge, said lock member being bowed into said counterbore such that its outer edge is in locking engagement with the inner wall of said counterbore and its inner edge is adjacent to said recessed portion of said screw.

3. The combination according to claim 2, wherein said lock member includes a C-shaped main portion and a plurality of teeth formed about the outer edge of said main portion at an acute angle to the plane of said main portion.

4. A lock fastener for fastening a reel to a fishing rod comprising a reel retainer having a threaded bore and a counterbore, a screw having an elongated shank with a tip portion threaded to fit within said threaded bore, a main body portion dimensioned to fit through a bore in said rod, and a recessed portion formed between said threaded tip and main body portions, and a lock member positioned between said recessed portion of said screw and said counterbore, said lock member having an outer diameter greater than the inner diameter of said counterbore and an inner diameter less than the diameter of said threaded and main body portions, wherein said lock member is bowed into wedging engagement with the inner wall of said counterbore by said main body portion when said screw is first screwed into said bore, and said wedged lock member restricts withdrawal of said screw from said reel retainer once said threaded portion engages said lock member.

5. A lock fastener according to claim 4, wherein said lock member includes a C-shaped main portion and a plurality of teeth formed about the outer edge of said main portion at an acute angle to the plane of said main portion.

6. A lock fastener comprising a first member having a threaded bore and a counterbore formed therein, an elongated second member having a main body portion, a threaded tip to fit within said threaded bore and a recessed portion formed therebetween, and lock means positioned between said first member and the recessed portion of said second member to permit only partial withdrawal of said second member once said fastener has been initially tightened said main body portion being dimensioned to pass through a bore in a third member whereby said first and third members may be secured for limited relative displacement.

7. A lock fastener according to claim 6 wherein said lock means includes a lock member having an inner and an outer edge, said lock member being bowed into said counterbore such that the outer edge is in locking engagement with the inner wall of said counterbore and its inner edge is adjacent to said recessed portion.

* * * * *